(12) United States Patent
Manley et al.

(10) Patent No.: US 7,246,271 B2
(45) Date of Patent: Jul. 17, 2007

(54) METHOD FOR DIAGNOSING COMPLEX SYSTEM FAULTS

(75) Inventors: Douglas R. Manley, Fort Collins, CO (US); William H. Bush, Fort Collins, CO (US)

(73) Assignee: Agilent Technologies, Inc., Santa Clara, CA (US)

( * ) Notice: Subject to any disclaimer, the term of this patent is extended or adjusted under 35 U.S.C. 154(b) by 495 days.

(21) Appl. No.: 10/692,188

(22) Filed: Oct. 23, 2003

(65) Prior Publication Data

US 2005/0102566 A1 May 12, 2005

(51) Int. Cl.
G06F 11/00 (2006.01)
(52) U.S. Cl. .......................................... 714/47; 714/48
(58) Field of Classification Search ................. 714/47, 714/48, 37, 26
See application file for complete search history.

(56) References Cited

U.S. PATENT DOCUMENTS

| | | | |
|---|---|---|---|
| 5,808,919 A * | 9/1998 | Preist et al. ................. 702/183 |
| 5,922,079 A * | 7/1999 | Booth et al. .................. 714/26 |
| 6,000,045 A * | 12/1999 | Lewis .......................... 714/47 |
| 6,255,943 B1 * | 7/2001 | Lewis et al. ................. 340/506 |
| 6,603,396 B2 * | 8/2003 | Lewis et al. ................. 340/506 |
| 2002/0019870 A1 * | 2/2002 | Chirashnya et al. ........ 709/224 |
| 2002/0042896 A1 * | 4/2002 | Johnson et al. ............... 714/47 |
| 2002/0133757 A1 * | 9/2002 | Bertram et al. ............... 714/47 |
| 2003/0115511 A1 * | 6/2003 | Kubota ......................... 714/47 |
| 2003/0159093 A1 | 8/2003 | Manley |
| 2003/0177416 A1 | 9/2003 | Manley |

* cited by examiner

*Primary Examiner*—Scott Baderman
*Assistant Examiner*—Tim Bonura

(57) ABSTRACT

An improved method and system for diagnosing faults of a system under test is provided. One or more candidate diagnoses potentially responsible for observed testing failures are generated. Each candidate diagnosis is then assigned a weight based in part on any of a number of factors not previously considered in the weighting process, thus making the weighting process more accurate. In one case, the weight of a diagnosis may be based on the combined consistent utilization of the candidate diagnosis across all failing system tests. Alternately, or in addition, that weight may be based on the combined utilization of the diagnosis among all passing system tests. Other potential factors may also be used.

56 Claims, 3 Drawing Sheets

METHOD FOR DIAGNOSING COMPLEX SYSTEM FAULTS

BACKGROUND OF THE INVENTION

Over recent years, several methods for diagnosing faults in systems comprised of multiple components have been devised. Typically, such methods utilize information concerning the structure of the system, the types of tests executed on the system, and the results of those tests in order to identify the system component most likely responsible for any test failures encountered.

Such diagnostic methods often have been applied to electronic systems at varying levels of abstraction. For example, a defective computer among hundreds or thousands of computer systems constituting a computer network may be identified by such a method. Similarly, the same method may be employed to identify the source of faults within a single computer, printed circuit board, or integrated circuit. Furthermore, such methods may be utilized in systems residing outside the electronics domain, including, but not limited to, mechanical, aeronautical, and medical or biological systems.

A diagnostic system employing such a method has been described in U.S. Pat. No. 5,808,919 by Christopher Preist and David Allport, which is assigned to the assignee of the present invention. Generally speaking, such a system begins its diagnosis by generating sets of logically possible diagnoses. The system accomplishes this task by first identifying "conflict sets," wherein each set identifies all of the components involved in a particular set of failing functional tests. Conceptually, each test, whether failing or passing, employs one or more "operations," or functions, with each operation employing one or more physical "components" of the system. Each component is exercised by an operation at a particular level of "utilization," or coverage, represented as a fraction between 0 and 1 inclusive, with 0 indicating no utilization, and 1 representing complete utilization of the component. Using these conflict sets, the system then generates a number of "hitting sets," with each representing a set of components that, if defective, would result in the identified set of failing functional tests. Therefore, each hitting set represents a logically possible diagnosis, given the results of failing tests.

Once each of the possible hitting sets, or candidate diagnoses, is identified, each is assigned a relative weight by way of calculation of various probabilities of failure. The basis of the calculations is Bayes' Rule:

$$p(D|T)=(p(D)*p(T|D))/p(T),$$

Using this rule, D=a candidate diagnosis and T=the complete set of failing and passing test results. $p(D|T)$ is the probability of the components of the candidate diagnosis failing, given the set of test results. This value is also known as the "posterior probability" of the candidate diagnosis. Alternately, $p(D)$ is the "prior probability" of the components of the candidate diagnosis failing when no information concerning test results is considered. Additionally, $p(T|D)$ is the probability of a given set of test results, given a particular candidate diagnosis is correct. Finally, $p(T)$ is the probability of a particular set of test results regardless of the correct candidate diagnosis.

Typically, the specific value of the posterior probability of the candidate diagnosis is not required; what is important is the relative ranking of the posterior probability for each candidate diagnosis so that the diagnosis most likely responsible for the observed test results is identified. Therefore, since $p(T)$ is the same for each candidate diagnosis, that term may be canceled from $p(D|T)$ for each candidate diagnosis, leaving a relative posterior probability:

$$\text{Relative } p(D|T)=p(D)*p(T|D)$$

To calculate the first factor, $p(D)$, an assumption is normally made that each of the components of the candidate diagnosis fail independently. As a result, the prior probability of the candidate diagnosis may be calculated by multiplying together the failure rate of each component of the candidate diagnosis:

$$p(D) = \prod_{\forall\ components \in D} (\text{failure rate (component)})$$

(In the previous equation, as well as in ones to follow, "$\forall$" symbolizes "for all," and "$\in$" signifies "element(s) of.")

The failure rate of each component employed is usually provided by the manufacturer of that particular component, based on empirical evidence over many thousands of components produced. Additionally, the failure rate may also include other sources of error, such as "process errors" (e.g., the improper placement or soldering of the component to a printed circuit board).

To calculate $p(T|D)$ for a particular candidate diagnosis, the diagnosis system typically assumes that the results for each test are independent to simplify the calculations involved. In that case, the probabilities of each test result for a candidate diagnosis are simply multiplied. For example, if two tests, $T_1$ and $T_2$, are involved, the resulting $p(T|D)$ would be the product of the probabilities involving each test:

$$p(T|D)=p(T_1|D)*p(T_2|D)$$

To further reduce the complexity of the calculations involved, an additional assumption is normally made that the probability of a test failing, given the failure of a particular component of a candidate diagnosis, is proportional to the utilization of that component by that particular test. Likewise, the probability of a test passing, given the failure of a component, is assumed to be (1−the utilization of that component by the passing test). For example, if $T_1$ is a failing test, $T_2$ is a passing test, and the candidate diagnosis is a single component $C_1$, the posterior priority of the overall test results, given a candidate diagnosis, may be stated as follows:

$$p(T|D)=\text{utilization of } C_1 \text{ in } T_1 *(1-\text{utilization of } C_1 \text{ in } T_2)$$

In some alternate applications, the utilization of the component of a failing test is assumed to be one, further simplifying the overall calculation at the possible expense of some inaccuracy in determining the relative posterior probability for each hitting set. Such a simplification is possible if the component involved is simple enough that any operation exercising it employs essentially the entirety of the component.

In the case where a candidate diagnosis consists of multiple components, the utilization of each of the components by each of the failing tests, and one minus the utilization of the each component by each passing test, may be factored together to generate $p(T|D)$.

Once $p(D)$ and $p(T|D)$ are determined for a candidate diagnosis (i.e., hitting set), they are multiplied together to obtain the relative posterior probability $p(D|T)$ for that diagnosis, as shown above. $p(D|T)$ for each diagnosis is then transformed to a final relative weight by the possible application of an "operation penalty." The operation penalty is applied if the diagnosis involves operation violations, which are operations which are involved in both passing and failing tests, thus implying an inconsistency in the test results. In those cases, the weight of that diagnosis is penalized, or reduced, to reflect that inconsistency.

To determine if the operation penalty, which is typically a single scalar factor less than one sometimes called the "input variability," is to be applied to the weight of a particular candidate diagnosis, each failing test $T_i$ is analyzed in turn. Generally speaking, the input variability is a measure of the expected variability of results over multiple uses of the same operation. In other words, the more repeatable the results of a particular operation, the lower the input variability. Each operation of $T_i$ that involves a component of the candidate diagnosis is identified. If each of those operations is also involved in a passing test, the operation penalty is to be applied. Once a failing test $T_i$ fits this description, the operation penalty is applied only once; only if none of the failing tests indicate application of the penalty is the penalty not applied.

Once the relative weight of each of the candidate diagnoses is calculated, the diagnosis with the highest relative weight is the one determined by the diagnostic system as being the most likely cause of the failures detected by the tests (i.e., the correct diagnosis).

In some alternative versions, no assumption is made that the probability of a test failing, given the failure of a particular component, is proportional to the utilization of that component by the test. In that case, the relative weight of a candidate diagnosis, given a set of test results, may be defined as follows:

Weight($D,T$)=$p(D)$*minimum($\alpha_i$, i=1 to N), wherein $\alpha_i$=1—utilization of component $C_j$ by test i, where i is a passing test, and $C_j$ is a member of D, or
$\alpha_i$=1 where i is a failing test, and
N=the total number of passing and failing tests Therefore, the maximum utilization of a component in any passing test is used to alter the weight of the candidate diagnosis. Also, the actual utilization of a component in a failing test is not considered.

In the case of a multiple-component diagnosis, p(D) is sometimes replaced by the product of the prior probabilities of each component $C_j$. The utilization factor may be replaced, for example, by the minimum or average utilization for each component $C_j$.

Additionally, systems under test that include subcomponents of components may be diagnosed. Since a component is viewed as the smallest portion of the system that may be replaced upon failure, the failure of any subcomponent of a component would necessitate replacement of the entire component. In this situation, the weight of each component is calculated separately. Afterward, the relative weight of the component as a whole is then the maximum of the weights calculated for each of the component's subcomponents separately. Subcomponents residing outside a defined hitting set or candidate diagnosis are not considered in determining the weight of that diagnosis.

Although diagnostic systems of this type have been extremely useful in many cases, some systems exhibit failures that have proven difficult to diagnose. For example, some radio-frequency (RF) devices exhibit complex faults that often result in seemingly conflicting passing and failing test results, resulting in operation penalties being assessed for multiple candidate diagnoses, often causing those diagnoses to be equally weighted. Such weighting leads to reduced guidance concerning which components of the system to replace first. Additionally, some tests utilizing a particular operation may pass or fail intermittently due to the uncertain nature of the specific measurement involved with those tests, thereby skewing the weighting.

From the foregoing, a need exists for a more reliable method of diagnosing faults in systems that is able to distinguish between candidate diagnoses when complex faults, often resulting in confusing and conflicting test results, are involved.

SUMMARY OF THE INVENTION

Embodiments of the invention, to be discussed in detail below, provide an improved method for diagnosing faults of a system under test. One or more candidate diagnoses, each of which is potentially responsible for failures observed during testing, are generated. Thereafter, each candidate diagnosis is assigned a weight based in part on any of a number of factors not previously integrated into the weighting process, that weight indicating a level of confidence that the diagnosis is correct. For example, the weight of a diagnosis may be based on the combined unviolated utilization of the candidate diagnosis across all failing system tests. Alternately, or in addition, the weight may be based on the combined utilization of the candidate diagnosis among all passing system tests. Other factors that may be utilized instead of, or in addition to, those mentioned above, such as an observed variability of the results of passing and failing system tests, may form the basis of the weight of the candidate diagnosis as well.

Generally speaking, the use of such factors in weighting a candidate diagnosis produces a more accurate indication of whether the associated diagnosis is correct. As a result, circumstances in which closely valued or identical weights for multiple candidate diagnoses result are significantly reduced.

Other aspects and advantages of the invention will become apparent from the following detailed description, taken in conjunction with the accompanying drawings, illustrating by way of example the principles of the invention.

DETAILED DESCRIPTION OF THE PREFERRED EMBODIMENTS

Figure 1:
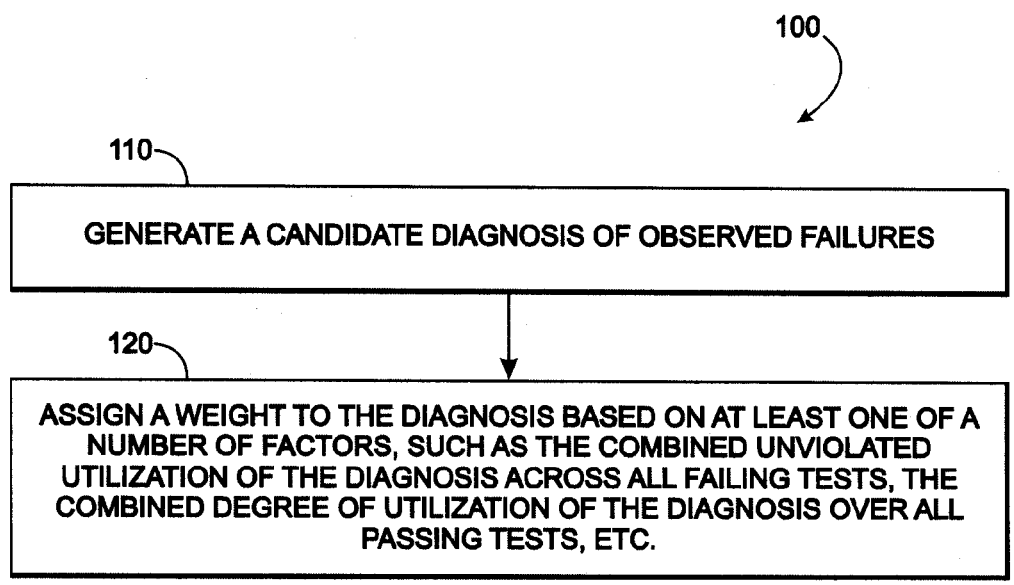
FIG. 1 is a high-level flow chart of a method of diagnosing dynamic system faults according to an embodiment of the invention.

A high-level description of a method 100 according to an embodiment of the invention for diagnosing complex faults of a system under test (SUT) is shown in FIG. 1. In general terms, given a model of the SUT, a model for each passing and failing test performed on the SUT, and the results of those tests, at least one candidate diagnosis is generated (step 110). Typically, the candidate diagnosis is initially in the form of a hitting set, as described above. Using the same models and test results, a weight is then assigned to each diagnosis (step 120). Factors that may contribute to the weight include values that have not been previously considered in the prior art, such as the combined unviolated utilization of each diagnosis across all failing tests and the combined utilization, whether violated or unviolated, of the corresponding diagnosis across all passing tests. Other possible factors not considered in prior art diagnostic system are described below. Other factors typically taken into account, including the failure rate of each component of a candidate diagnosis, may also contribute to the weight of each diagnosis, as shown below. Once all factors are considered, the highest weight calculated indicates the most likely candidate diagnosis responsible for the observed failing tests.

Typically, embodiments of the present invention are implemented in software executed on a general-purpose single computer system, a distributed general-purpose computing system, a special-purpose computing system designed specifically for dynamic system testing, a microprocessor-based computing system, or any other electronic system capable of executing an algorithm represented in software. Additionally, although software is the most likely medium, embodiments according to the invention also may be implemented in firmware for an embedded controller, or in hardware, such as in an application-specific integrated circuit (ASIC), for example.

Figure 2:
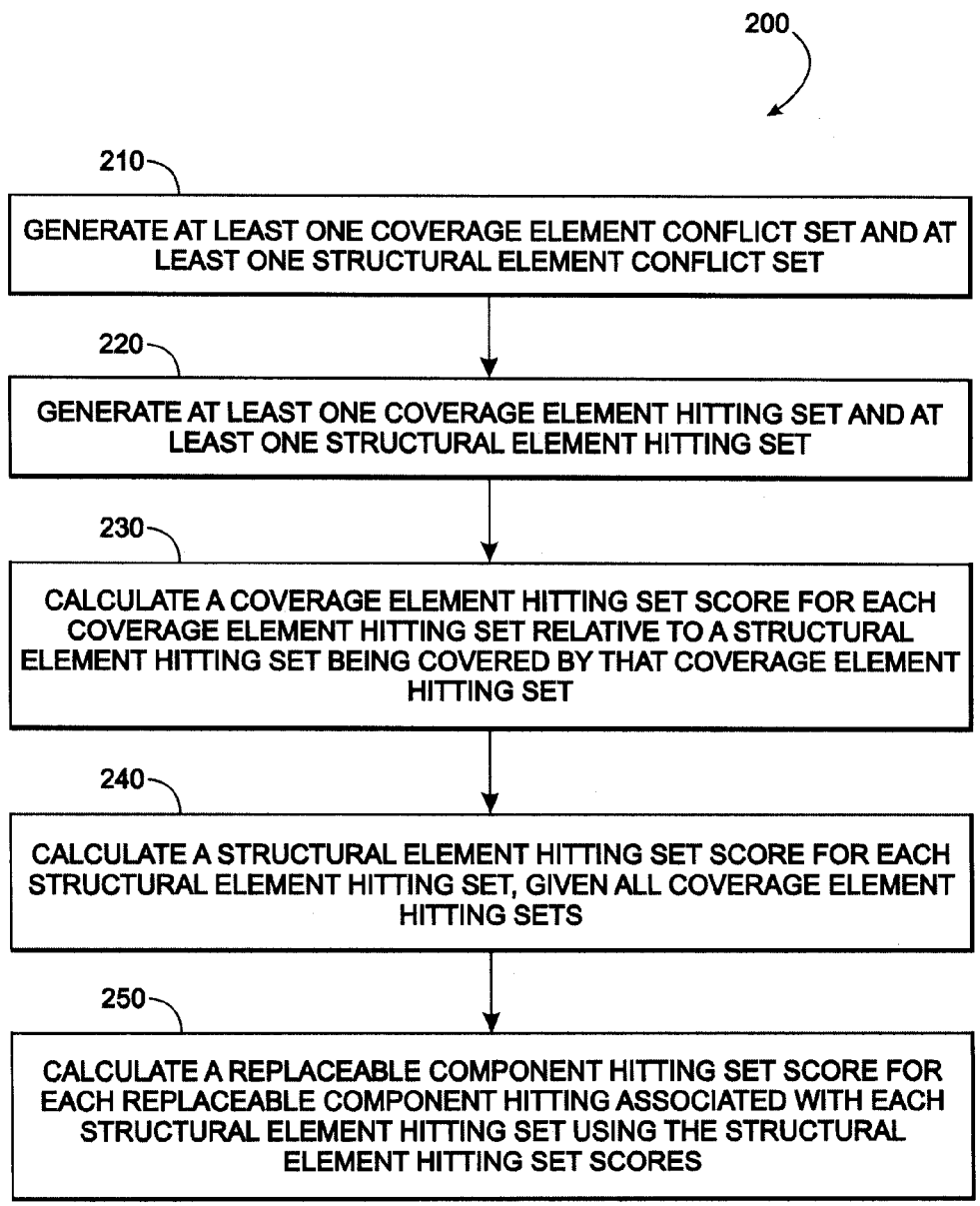
FIG. 2 is a flow chart of a method according to embodiments of the invention of generating and weighting candidate diagnoses possibly responsible for an observed test failure.

To further explain the salient features of various embodiments of the invention, a detailed description and some possible alterations of a specific embodiment are provided below, followed by some examples of how that embodiment applies to some simplified test cases. A pictorial representation of the general flow of a particular diagnosing method 200 is shown in FIG. 2.

As noted above, generation of candidate diagnoses (step 110 of FIG. 1) is based on the system and test models, and the observed test results. In this particular example, the process begins with each test $T_i$ executed on the SUT being identified with a set of "coverage elements," with each coverage element being either a "structural element coverage" or a "shared function."

A structural element coverage is an unnamed pair, consisting of (1) a component or subcomponent of a system under test (SUT), termed a "structural element," and (2) a utilization factor within the range of [0,1], which indicates the relative amount of the associated component or subcomponent that is utilized, or "covered," by the test $T_i$. As an example, a structural element coverage that indicates a 70% utilization of a component $C_1$ may be denoted $(C_1, 0.7)$. Likewise, a structural element coverage involving a 30% utilization of a subcomponent $sc_1$ of component $C_2$ may be indicated as $(C_2::sc_1, 0.3)$.

Since a structural element coverage is unnamed, a single structural element coverage may not appear in more than one test, and hence, cannot be violated (i.e., cannot be utilized in both a passing test and a failing test). For example, multiple instances of $(C_2::sc_1, 0.3)$ within multiple tests are not violated since each of the instances of that structural element coverage do not necessarily cover the same portions of the subcomponent $C_2::sc_1$.

A shared function is a named set of structural element coverages associated with a particular operation. For example, a shared function sf1 which involves the two above-mentioned shared element coverages may be denoted as sf1=$((C_1, 0.7), (C_2::sc_1, 0.3))$. The same shared function may be present in one or more tests due to its being associated with a particular name, and thus, by definition, may be violated (i.e., may be employed in both a passing test and a failing test). Shared functions are essentially identical to the "operations" concept noted above.

When a particular test $T_i$ fails, the set of coverage elements associated with that test is termed a "coverage element conflict set" (CECS) (step 210 of FIG. 2). Similarly, the structural elements (i.e., component or subcomponent) that are utilized in the coverage element conflict set collectively comprise a "structural element conflict set" (SECS) (step 210).

Figure 3:
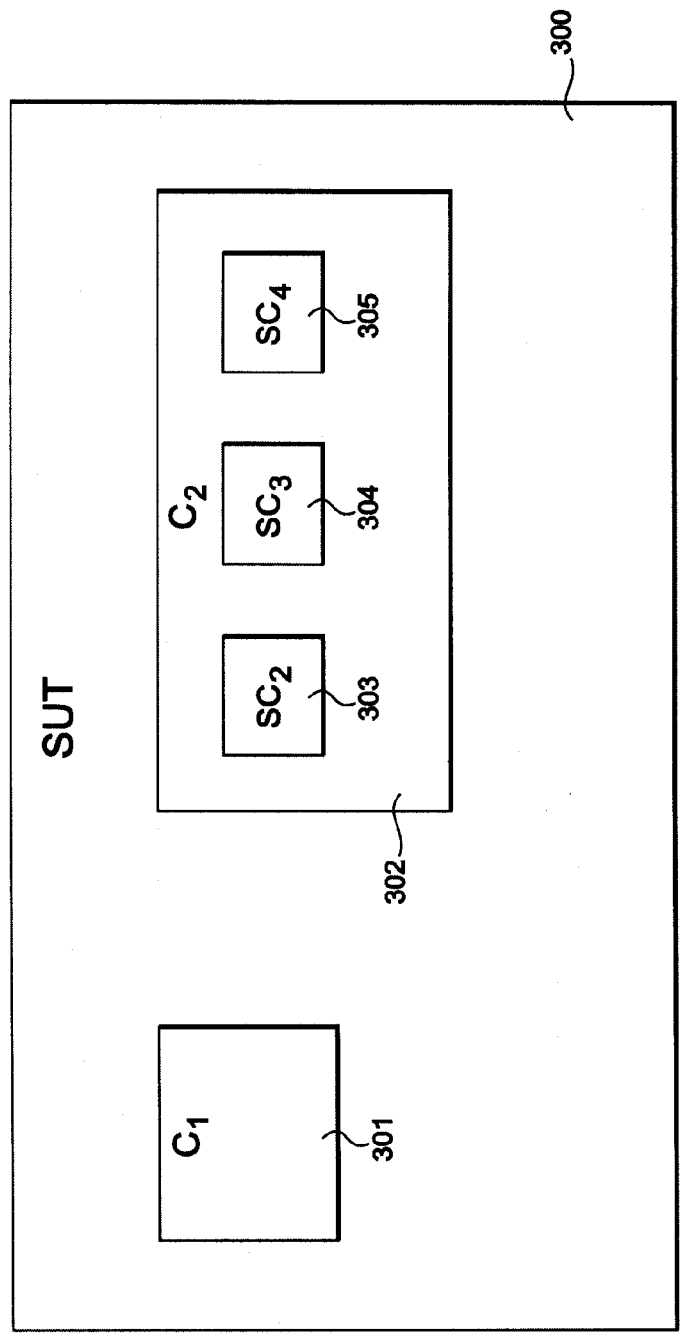
FIG. 3 is a block diagram representation of the system under test and its constituent parts.

As an example, and with specific reference to FIG. 3 of the drawings, assume failing tests $T_1$ and $T_2$, and passing tests $T_3$, $T_4$ and $T_5$, as shown in the following simplified SUT 300 and test models:

Components:
$C_1$ 301: Subcomponents: None
$C_2$ 302: Subcomponents: $sc_2$ 303, $sc_3$ 304, $sc_4$ 305
Shared Functions:
sf1=$\{(C_1$ 301$, 0.6)\}$
sf2=$\{(C_2$ 302$::sc_2$ 303$, 0.4)\}$
sf3=$\{(C_2$ 302$::sc_3$ 303$, 0.3)\}$
sf4=$\{(C_2$ 302$::sc_3$ 303$, 0.6)\}$
Tests:
$T_1$=$\{$sf1, sf3$\}$; Result=Fail
$T_2$=$\{$sf1, sf2, sf4, $(C_2$ 302$::sc_4$ 305$, 0.7)\}$; Result=Fail
$T_3$=$\{$sf1, sf4, $(C_2$ 302$::sc_2$ 303$, 0.4)$, $(C_2$ 302$::sc_3$ 304, 0.5), $(C_2::sc_4, 0.2)\}$; Result=Pass
$T_4$=$\{$sf3, $(C_1$ 301$, 0.9)\}$; Result=Pass
$T_5$=$\{$sf1, sf2$\}$; Result=Pass In this case, the coverage element conflict sets for failing tests $T_1$ and $T_2$ are CECS($T_1$)=$\{$sf1, sf3$\}$ and CECS($T_2$)=$\{$sf1, sf2, sf4, $(C_2::sc_4, 0.7)\}$.

Continuing with this example, a "structural element conflict set" (SECS) is also associated with each failing test. A structural element conflict set is a set of structural elements wherein each element has some coverage, by way of a structural element coverage or a shared function, in the coverage element conflict set for a particular failing test. In this case, the structural element conflict sets for failing tests $T_1$ and $T_2$ are SECS($T_1$)=$\{C_1, C_2::sc_3\}$ and SECS($T_2$)=$\{C_1, C_2::sc_2, C_2::sc_3, C_2::sc_4\}$.

Based on these conflict sets, associated "hitting sets" may then be derived therefrom (step 220 of FIG. 2). A "coverage element hitting set" (CEHS), for example, is a set of coverage elements that has a non-empty intersection with every coverage element conflict set. In other words, a coverage element hitting set must have at least one coverage element from each coverage element conflict set. Thus, for the above example, one possible coverage element hitting set is CEHS=$\{$sf1$\}$ since sf1 is a coverage element of both failing tests $T_1$ and $T_2$; This set may also be referred to as a minimal coverage element hitting set, as it contains the least number of elements possible, which is one in this case. Another possible coverage element hitting set that is non-minimal is CEHS=$\{$sf1, sf2$\}$.

Also, one or more "structural element hitting sets" may be identified from the structural element conflict sets identified for each failing test (step 220 of FIG. 2). Analogous to coverage element hitting sets, a structural element hitting set (SEHS) has a non-empty intersection with every structural element conflict set. Put another way, each structural element hitting set is required to have at least one structural element from each structural element conflict set. Using the same example shown in FIG. 1, two possible minimal structural element hitting sets are $\{C_1\}$ and $\{C_2::sc_3\}$.

The concept of conflict sets and hitting sets has been the subject of significant research. These concepts, as well as potential algorithms for generating those sets, is discussed in greater detail, for example, by R. Reiter in "A theory of diagnosis from first principles," published in Artificial Intelligence 32(1):57-96 (1987).

Closely related to each structural element hitting set is a "replaceable component hitting set," which is a structural element set that includes only components, as opposed to subcomponents. For example, the replaceable component hitting set (RCHS) associated with a structural element hitting set SEHS={$C_2$::$sc_3$} is RCS={$C_2$}. Replaceable component hitting sets are valuable from the standpoint that each element of such a set is an identifiable component which may be replaced if found to be defective. Each candidate diagnosis to be weighted according to embodiments of the present invention, discussed immediately hereafter, is a replaceable component hitting set, and also essentially a structural element hitting set.

Given the necessary hitting sets previously generated (step 220), embodiments of the present invention discussed herein generate scores for those hitting sets prior to generating weights for the replaceable component hitting sets, or candidate diagnoses. In other embodiments, scores may be directly generated for the replaceable hitting set using methods similar to those described below. While rather specific scoring formulae are explained below, these formulae are meant to be exemplary in nature; similar functions that are enveloped by the claims to follow may also be implemented within the scope of the present invention.

First, each coverage element hitting set is scored relative to a pertinent structural element hitting set (i.e., the structural elements are covered or utilized by one or more coverage elements) (step 230). Thus, multiple scores may be associated with a single coverage element hitting set. The method of scoring is dependent to a degree on whether any of the coverage elements of a particular coverage element hitting set is "violated" (i.e., whether any of the coverage elements are utilized in both passing and failing tests). If any of the coverage elements of the coverage element hitting set are employed in both passing and failing tests, then the score of the coverage element hitting set, given a particular structural element hitting set, depends in part upon a combined, or "average," "expected" coverage (EC) of all structural elements in the given structural element hitting set for all coverage elements of the coverage element hitting set that, in turn, are utilized in failing tests and not in passing tests (i.e., the combined "unviolated" utilization of the structural element hitting set). In addition, that score is also proportional to the combined "observed shared function variability" (OSFV) of "pass-fail conflicted" shared functions (i.e., shared functions employed in both passing and failing tests) that are elements of the coverage element hitting set:

$$Score_{CEHS}(CEHS_i | SEHS_j) = \prod_{\forall Pass-fail\ conflicted\ SF \in CEHSj} OSFV *$$
$$\left(1 + \left(\sum_{\forall SE \in SEHSj} EC(SE)_{\forall CE \in CEHSi \in Failing\ tests \not\in Passing\ tests} / |SEHS_j|\right)\right)$$

The expected coverage of a single structural element that is utilized in a single coverage element is just the coverage noted within the associated structural element coverage, as mentioned above. If a structural element is utilized in two coverage elements, the expected coverage of the structural element is defined in the disclosed embodiments as the two coverages added together, minus an expected intersection, or assumed "overlap":

$$EC(coverage_1, coverage_2) = coverage_1 + coverage_2 - (coverage_1 * coverage_2)$$

If three or more coverages are to be combined, the same method may be applied in an iterative fashion. For example, three coverages may be combined by first combining any two, and then combining the third thereafter:

$$EC(coverage_1, coverage_2, coverage_3) = EC((EC(coverage_1, coverage_2)), coverage_3)$$

In alternate embodiments, other mathematical methods of "combining" two such coverage values other than averaging may be employed. For example, dividing the sum of the expected coverage of the structural elements by the number of elements of the structural element hitting set may not be necessary in some embodiments. Also, merely counting the number of structural elements involved, instead of adding the expected coverages of those structural elements, may be all that is required in some circumstances. Other variations not listed herein are also possible.

Additionally, not all coverages of a particular coverage element are included in the expected coverage computation. Whether a coverage for a particular coverage element is included in the overall expected coverage depends on whether the coverage element is a structural element coverage or a shared function. All coverages associated with structural element coverages do not necessarily coincide and, hence, are included in the calculation. However, since the coverage associated with a shared function is considered to be approximately the same each time the shared function is utilized, only one instance of a coverage for a shared function is included in the calculation, even if multiple uses of the shared function across multiple tests are involved.

The observed shared function variability of a particular pass-fail conflicted shared function is essentially an operation penalty, similar to what has been provided for in previous diagnostic systems. However, instead of employing a constant "input variability" for this value, as has been done in the past, the observed shared function variability depends upon the input variability, adjusted by the number of passing and failing tests observed that employ the shared function, making the observed variability a value that more closely resembles the confidence that ordinarily would be placed in the observed test results:

$$OSFV_{SF} = \min(0.9, InputVariability_{SF}*2, InputVariability_{SF}*(1+0.1(|FailedTests|SF \in failedtest|-1)/|PassingTests|SF \in passingtest|))$$

In this embodiment, the observed shared function variability decreases greatly with the number of passing tests, and increases slowly by about ten times with the number of failed tests observed. In alternate embodiments, other methods of allowing the number of failed and passing tests to affect the observed shared function variability may also be employed. Also, instead of employing the number of failed and passing tests employing the shared function, other methods of quantifying the observed shared function variability may be used. For example, the utilization of the structural elements by the shared function may be used to quantify the observed shared function variability.

In the specific calculation shown above, the observed shared function variability is limited at its maximum by 0.9 and by twice the input variability of the shared function. In this particular case, the use of such limits, referred to herein as mathematical "governors," restricts the impact of the observed shared function variability on the ultimate weighting of the candidate diagnosis. In general, governors limit the effect that uncertain or incomplete knowledge, such as why particular tests pass or fail utilizing the same shared function, has on the ultimate weighting. Governors, as will be indicated below, may also limit the minimum value of a weighting factor, the size of a factor relative to another, and so on. Furthermore, use of governors as shown is not mandatory in other embodiments of the present invention. Additionally, governors may not be limited to those instances indicated, but may be employed with any factor of the disclosed computation to limit that factor's effect on the overall weighting of the candidate diagnoses.

As a result, the score of a coverage element hitting set, and ultimately the weight of an associated candidate diagnosis, is based in part on the combined, unviolated utilization of that diagnosis across one or more failing tests. As shown above, the observed variability of the shared functions involved also affects that score.

In alternate embodiments, observed variability may not be related solely to the presence of pass-fail conflicted shared functions. For example, a subset of system tests might be dependent on each other in varying ways, such as by covering similar physical portions of a particular component. If one system test of that subset fails while another passes, some level of variability has been observed, thus reducing the level of confidence in the test results. By quantifying the level of dependence between tests, the observed variability involved may also be quantified, allowing for some mathematical reduction in the weight of a candidate diagnosis associated with those tests.

Once the coverage element hitting sets are scored, a score is computed for each of the structural element hitting sets, given the entire set of coverage element hitting sets (step 240 of FIG. 2). The score of each structural element hitting set is inversely dependent upon the combined passing test utilization of the structural element hitting set. In other words, the higher the utilization of each structural element of the hitting set by a passing test, the lower its score indicating that the structural element is faulty. Also, the score of a structural element hitting set is proportional to the maximum score for any coverage element hitting set defined for that structural element hitting set:

$$Score_{SEHS}(SEHS_i | \{CEHS\}) =$$

$$\max\left(1 - \sum_{\forall SE \in SEHSi} EC(SE)_{\forall CE \in CEHS \in Passing\ tests} / |SEHS_i|\right), 0.01) *$$

$$\max(Score_{CEHS}(\forall\ CEHS \in \{CEHS\} | SEHS_i))$$

The expected coverage portion of the score for a structural element hitting set serves as a combined degree of utilization of the structural elements of the hitting set over all passing tests. The higher the coverage by the passing tests, the lower the overall score for the structural element hitting set. Also, this portion of the score is limited by a governor so that those passing tests cannot provide more than a 99% confidence that the structural element hitting set is not defective. Such a governor may also be eliminated in alternate embodiments of the current invention.

Once calculated, the scores for the structural element hitting sets are combined with the failure rate for a "replaceable component hitting set" (RCHS), or candidate diagnosis, represented by the structural element hitting set to obtain a score for the replaceable component hitting set (step 250 of FIG. 2). Such scoring depends on whether any subcomponents are identified in the structural element hitting set.

If no subcomponents are identified in the particular structural element hitting set, then the structural element hitting set and the replaceable component hitting set are one and the same. In that case, the failure rate of the replaceable component hitting set is multiplied by the score of that hitting set:

$$Score_{RCHS}(RCHS_i | |subcomponents|=0) = FailRate(RCHS_i) * Score_{SEHS}(RCHS_i | \{CEHS\})$$

As mentioned above, the failure rate of a replaceable component hitting set may include the manufacturing failure rate of the component itself, the failure rate of that component due to process errors, and the like.

Normally, a replaceable component hitting set consists of a single component, making the failure rate of the replaceable component hitting set equivalent to the failure rate of that component. In cases where more than one component is involved, the failure rates of the separate components may be simply multiplied together if failures of the components are highly independent.

In the case that subcomponents are named in a structural element hitting set, the replaceable component hitting set has as its elements the components which include the subcomponents of the structural element hitting set. The score for this type of replaceable component hitting set in the present embodiment is proportional to the maximum score for structural element hitting sets that include subsets of the subcomponents of the replaceable component hitting set. In addition, that score is also dependent upon the average passing confidence of subcomponents not existing in any structural element hitting set. In other words, subcomponents that reside both within and outside the structural element hitting set are considered:

$$Score_{RCHS}(RCHS_i | |subcomponents \in RCHS_i| > 0) =$$

$$FailRate(RCHS_i) * \max(Score_{SEHS}(\forall\ SEHS\ having\ subcompoents \in RCHS_i | \{CEHS\})) *$$

$$\max\left(1 - \sum_{\forall subcompents \in RCHSi \notin any\ SEHS} EC(subcomponent) / |subcomponents \in RCHS_i \notin any\ SEHS|, 0.5\right)$$

Additionally, a governor (i.e., 0.5 in the above formula) is used in this implementation which limits the effect of the subcomponents of the replaceable component hitting set that reside outside of the associated structural element hitting set in reducing the weight of the candidate diagnosis. Use of that particular governor, or any governor at all, is not required.

According to the above equation, average passing utilization of subcomponents residing outside any hitting set is considered. In alternate embodiments, utilization of those subcomponents by failing tests, or some combination of both failing and passing utilization, may also be employed to adjust the score of the replaceable component hitting set.

Also in this particular embodiment, only subcomponents outside any structural element hitting set are considered in reducing the score of the replaceable component hitting set. In alternate embodiments, subcomponents of the RCHS that are outside the structural element hitting set associated with the RCHS, but within another SEHS, may be considered.

Given the above formulae utilized in the particular embodiment of the present invention, describing a few simple test cases aids in explaining how the above equations are applied in particular situations, and how the various equations interact to obtain a weight for each candidate diagnosis.

EXAMPLE 1

In Example 1, described below, weights for a set of candidate diagnoses involving only failing tests are calculated. Models for the components of the SUT, the shared functions employed, and the tests executed are as follows:

Components:
$C_1$: FailRate=0.01; Subcomponents: $sc_1$
$C_2$: FailRate=0.01; Subcomponents: None Shared Functions:
sf1={($(C_1::sc_1, 0.5)$)}; Input variability=0.1
sf2={($(C_1::sc_1, 0.9)$)}; Input variability=0.1
sf3={($(C_2, 0.1)$)}; Input variability=0.1

Tests:
$T_1$={sf1, sf3}; Result=Fail
$T_2$={sf2, sf3, ($C_1::sc_1$, 0.2)}; Result=Fail
$T_3$={sf3, ($C_1::sc_1$, 0.1)}; Result=Fail As no passing tests are involved, no shared function violations are possible. As a result, observed shared function variability (OSFV) is not considered, so that factor has the value of one. Possible coverage element hitting sets and structural element hitting sets are generated as described earlier:

CEHS={{sf3}, {sf1, ($C_1::sc_1$, 0.2), ($C_1::sc_1$, 0.1)}, {sf1, sf2, ($C_1::sc_1$, 0.1)}, {sf1, sf2, ($C_1::sc_1$, 0.1), ($C_1::sc_1$, 0.2)}}

SEHS={{$C_2$}, {$C_1::sc_1$}}

Since sf3 is the only shared function that utilizes component $C_2$, which is a structural element hitting set, only the coverage from the coverage element hitting set $CEHS_1$={sf3} figures into the scoring for that structural element hitting set. The three remaining coverage element hitting sets, as they only cover the subcomponent $C_1::sc_1$, contribute to the score for that structural element hitting set.

Given $SEHS_1$={$C_2$}, the score for $CEHS_1$={sf3} is calculated as follows:

$$Score_{CEHS}(CEHS_1|SEHS_1) = 1 + EC_{sf3}(C_2) = 1.1$$

In turn, since there are no passing tests involved, the score for SEHS {$C_2$} is the maximum score for an associated coverage element hitting set, which in this case is simply the expected coverage of sf3 over $C_2$:

$$Score_{SEHS}(SEHS_1|\{CEHS\}) = Score_{CEHS}(CEHS_1|SEHS_1) = 1.1$$

Similarly, given $SEHS_2$={$C_1::sc_1$}, the three remaining CEHS, which are associated with $SEHS_2$, ($CEHS_2$={sf1, ($C_1::sc_1$, 0.2), ($C_1::sc_1$, 0.1)}, $CEHS_3$={sf1, sf2, ($C_1::sc_1$, 0.1)}, and $CEHS_4$={sf1, sf2, ($C_1::sc_1$, 0.1), ($C_1::sc_1$, 0.2)}) are calculated in a similar fashion, with the separate coverages of that single structural element combined as described above:

$$Score_{CEHS}(CEHS_2|SEHS_2) = 1 + EC_{\forall CE \in CEHS2}(C_1::sc_1) = 1 + EC(0.5, 0.2, 0.1) = 1.640$$

$$Score_{CEHS}(CEHS_3|SEHS_2) = 1 + EC_{\forall CE \in CEHS3}(C_1::sc_1) = 1 + EC(0.5, 0.9, 0.1) = 1.955$$

$$Score_{CEHS}(CEHS_4|SEHS_2) = 1 + EC_{\forall CE \in CEHS4}(C_1::sc_1) = 1 + EC(0.5, 0.9, 0.1, 0.2) = 1.964$$

Again, since there are no passing tests involved, the score for SEHS {$C_1::sc_1$} is the maximum score of the three associated coverage element hitting sets:

$$Score_{SEHS}(SEHS_2|\{CEHS\}) = \max(Score_{CEHS}(CEHS_2|SEHS_2), Score_{CEHS}(CEHS_3|SEHS_2), Score_{CEHS}(CEHS_3|SEHS_2)) = 1.964$$

Finally, the scores for the two replaceable component hitting sets, {$C_1$} (the replaceable component for $SEHS_2$={$C_1::sc_1$}) and {$C_2$}, are calculated. For component $C_2$, no subcomponents are involved, so the score is the previously calculated score for $SEHS_1$ times the component failure rate:

$$Score_{RCHS}(\{C_2\}) = FailRate(C_2) * Score_{SEHS}(SEHS_1|CEHS_1) = 0.01 * 1.1 = 0.011$$

For the replaceable component hitting set {$C_1$}, a subcomponent $C_1::sc_1$ is involved. However, since no subcomponents of $C_1$ reside outside of $SEHS_2$ or $SEHS_3$, the score for {$C_1$} is reduced to the no-subcomponent case:

$$Score_{RCHS}(\{C_1\}) = FailRate(C_1) * Score_{SEHS}(SEHS_2|\{CEHS\}) = 0.01 * 1.964 = 0.01964$$

Thus, given the scores for the two replaceable component hitting sets, component $C_1$ is calculated to be the most likely cause of the failing tests $T_1$, $T_2$, and $T_3$. This result is due to a great extent to the low utilization by sf3 of $C_1$ compared to the utilization of $C_2$ by shared functions sf1 and sf2.

EXAMPLE 2

In Example 2, a mixture of passing and failing tests is used to indicate how the scoring functions take such results into account. The models for the tests, components and shared functions are listed:

Components:
$C_1$: FailRate=0.01; Subcomponents: $sc_1$, $sc_2$, $sc_3$

Shared Functions:
sf1={($C_1::sc_1$, 0.4)}; Input variability=0.1
sf2={($C_1::sc_2$, 0.2)}; Input variability=0.1
sf3={($C_1::sc_2$, 0.3)}; Input variability=0.1
sf4={($C_1::sc_1$, 0.4)}; Input variability=0.1
sf5={($C_1::sc_3$, 0.7)}; Input variability=0.1

Tests:
$T_1$={sf1, sf4, sf5, ($C_1::sc_3$, 0.1)}; Result=Fail
$T_2$={sf1, sf2, sf3, ($C_1::sc_2$, 0.1)}; Result=Pass First, possible coverage element hitting sets and structural element hitting sets for this example are generated:

CEHS={{sf1}, {sf4}, {sf5}, {($C_1::sc_3$, 0.1)}}
SEHS={{$C_1::sc_1$}, {$C_1::sc_3$}}

To simplify the example for the purpose of facilitating understanding of the present invention, the number of coverage element hitting sets is reduced below to two: $CEHS_1$={sf4} and $CEHS_2$={sf5}.

As before, scoring of each of the coverage element hitting sets, $CEHS_1$ and $CEHS_2$, neither of which involve pass-fail conflicted shared functions, is performed relative to the structural element hitting sets with elements that are covered by each CEHS. In this case, sf4 utilizes only $C_1::sc_1$ (making up $SEHS_1$), and sf5 covers only $C_1::sc_3$ ($SEHS_2$). Hence, only those combinations need be considered when calculating CEHS scores:

$Score_{CEHS}(CEHS_1 \mid SEHS_1) =$ $$\prod_{\forall Pass-fail\ conflicted\ SF \in CEHS1} OSFV * (1 + (EC_{sf4}(C_1::sc_1))) =$$

$1 * (1 + 0.4) = 1.4$ $Score_{CEHS}(CEHS_2 \mid SEHS_2) =$ $$\prod_{\forall Pass-fail\ conflicted\ SF \in CEHS2} OSFV +$$

$(1 + EC(C_1::sc_3)_{\forall CE \in CEHS \in Failing\ tests \notin Passing\ tests}) =$ $1 * (1 + EC(EC_{sf5}(C_1::sc_3), EC_{(CI::sc3,0.1)}(C_1::sc_3))) =$ $1 + EC(0.7, 0.1) =$ $1 + 0.73 =$ $1.73$ In scoring CEHS$_2$, the coverages of both shared function sf5 and the structural element coverage (C$_1$::sc$_3$, 0.1) within failing test T$_1$ are combined.

The two structural element hitting sets are then calculated, using the CEHS scores just generated. For each SEHS, coverage of that hitting set by any passing tests reduces the score of that SEHS accordingly:

$Score_{SEHS}(SEHS_1 \mid \{CEHS\}) =$ $\max((1 - EC(C_1::sc_1)_{\forall CE \in CEHS \in T2}), 0.01) *$ $\max(Score_{CEHS}(\forall CEHS \in \{CEHS\} \mid SEHS_1)) =$ $\max((1 - EC_{sf1}(C_1::sc_1)), 0.01) *$ $Score_{CEHS}(CEHS_1 \mid SEHS_1) =$ $\max(1 - 0.4, 0.01) * 1.4 =$ $0.6 * 1.4 =$ $0.84$ In scoring SEHS$_1$, the coverage of the structural element C$_1$::sc$_1$ by sole passing test T$_2$ is by sf1 providing a coverage of 0.4. That coverage acts to decrease the score for SEHS$_1$ due to lowered confidence in that hitting set being the cause of the failing test T$_1$.

$Score_{SEHS}(SEHS_2 \mid \{CEHS\}) =$ $\max((1 - EC(C_1::sc_3)_{\forall CE \in CEHS \in T2}), 0.01) *$ $\max(Score_{CEHS}(\forall CEHS \in \{CEHS\} \mid SEHS_2)) =$ $\max(1 - 0, 0.01) * Score_{CEHS}(CEHS_2 \mid SEHS_2) =$ $\max(1, 0.01) * 1.73 =$ $1 * 1.73 =$ $1.73$ Contrary to SEHS$_1$, SEHS$_2$ contains structural element C$_1$::sc$_3$, which is not covered by passing test T$_2$, so the score for SEHS$_2$ is not reduced as a result.

As a result of these structural element hitting set scores, the score for the associated replaceable component hitting set $\{C_1\}$ is computed, keeping in mind that subcomponents of C$_1$ make up both SEHS$_1$ and SEHS$_2$:

$Score_{RCHS}(\{C_1\}) =$ $FailRate(C_1) * \max(Score_{SEHS}(SEHS_1 \mid \{CEHS\}),$ $Score_{SEHS}(SEHS_2 \mid \{CEHS\})) * \max$ $(1 - EC(EC_{sf2}(C_1::sc_2), EC_{sf3}(C_1::sc_2), EC_{(CI::sc2,0.1)}$ $(C_1::sc_2)), 05) =$ $0.01 * \max(1.4, 1.73) * \max(1 - EC(0.2, 0.3, 0.1), 0.5) =$ $0.01 * 1.73 * \max(1 - 0.496, 0.5) =$ $0.01 * 1.73 * 0.504 =$ $0.0087192$ Although this particular example results in a single replaceable component hitting set, making the actual selection of the defective component trivial, the above computation for the score for RCHS={C$_1$} shows the reducing effect that the subcomponent C$_1$::sc$_2$ that is not a part of any structural element hitting set. The coverage of that component by shared functions sf1 and sf2, as well as structural element coverage (C$_1$::sc$_2$, 0.1) within passing test T$_2$ reduces the weight otherwise given for C$_1$ if that subcomponent had not been taken into account.

EXAMPLE 3

The next example, although it also results in a single possible replaceable component hitting set, exemplifies the presence of multiple subcomponent structural element hitting sets in conjunction with passing coverage of subcomponents outside of any SEHS. The models for this particular model are as follows:

Components:

C$_1$: FailRate=0.01; Subcomponents: sc$_3$, sc$_4$, sc$_5$, sc$_6$

Shared Functions:

sf4={(C$_1$::sc$_4$, 0.6)}; Input variability=0.1 sf5={(C$_1$::sc$_5$, 0.7)}; Input variability=0.1 sf6={(C$_1$::sc$_6$, 0.8)}; Input variability=0.1

Tests:

T$_1$={sf5}; Result=Fail

T$_2$={sf6}; Result=Fail

T$_3$={sf4, sf5, sf6, (C$_1$::sc$_3$, 0.1)}; Result=Pass

Given this model, a single coverage element hitting set CEHS$_1$={sf5, sf6} is possible since both of these shared functions are necessary to cause tests T$_1$ and T$_2$ to fail, and no other coverage elements are required for those failures. Furthermore, the only coverage elements utilized within CEHS$_1$ are C$_1$::sc$_5$ (by sf5) and C$_1$::sc$_6$ (by sf6), resulting in a single structural element hitting set SEHS$_1$={C$_1$::sc$_5$, C$_1$::sc$_6$}.

In computing the score for CEHS$_1$, the fact that sf5 and sf6 are both pass-fail conflicted raises the need for computing the observed shared function variability (OSFV) of those shared functions. Also, since there are no other coverage elements within CEHS$_1$, there is also no coverage of those elements by failing tests that are not also covered by passing tests:

$$Score_{CEHS}(CEHS_1 \mid SEHS_1) =$$

$$\prod_{\forall Pass-fail\ conflicted\ SF \in CEHS1} OSFV *$$

$$\left(1 + \left(\sum_{\forall SE \in SEHS1} EC(SE)_{\forall CE \in CEHS1 \in Failing\ tests \notin Passing\ tests}\right)\right/$$

$$\mid SEHS_1 \mid) =$$

$$OSFV(sf5) * OSFV(sf6) * (1 + 0) =$$

$$\min(0.9, InputVariability(sf5) * 2, InputVariability(sf5) *$$

$$(1 + 0.1 * (1 - 1)/1) * \min(0.9, InputVariability(sf6) *$$

$$2, InputVariability(sf6)) * (1 + 0.1 * (1 - 1)/1) =$$

$$\min(0.9, 0.1 * 2, 0.1) * (0.9, 0.1 * 2, 0.1) =$$

$$0.1 * 0.1 =$$

$$0.01$$

Next, the score for the structural element hitting set $SEHS_1$ is computed, taking into account the fact that the structural elements $C_1::sc_5$ and $C_1::sc_6$ are covered by passing test $T_3$, thus reducing the score for $SEHS_1$:

$$Score_{SEHS}(SEHS_1 \mid \{CEHS\}) =$$

$$\max(1 - ((EC_{T3}(C_1::sc_5) + EC_{T3}(C_1::sc_6))/2), 0.01) *$$

$$\max(Score_{CEHS}(CEHS_1 \mid SEHS_1)) =$$

$$\max(1 - ((0.7 + 0.8)/2, 0.01)0.01 =$$

$$\max(1 - 0.75, 0.01) * 0.01 =$$

$$0.0025$$

Given the $SEHS_1$ score, the score for the sole replaceable component hitting set $\{C_1\}$ is calculated, taking into account the fact that the two subcomponents of $C_1$ residing outside $SEHS_1$, $C_1::sc_5$ and $C_1::sc_6$, were involved in passing tests:

$$Score_{RCHS}(\{C_1\}) =$$

$$FailRate(\{C_1\}) * \max(Score_{SEHS}(SEHS_1)) * \max(1 -$$

$$((EC_{sf4}(C_1::sc_4) + EC_{(C1::sc3,0.1)}(C_1::sc_3))/2), 0.5)$$

$$= 0.01 * 0.0025 * \max(1 - ((0.6 + 0.1)/2), 0.5) = 0.00001625$$

Therefore, the reductions in scoring due to the pass-fail conflicts of the shared functions sf5 and sf6, as well as the coverage of subcomponents $C_1::sc_3$ and $C_1::sc_4$ in passing test $T_3$, contribute to a relatively low score for the replaceable component $C_1$.

EXAMPLE 4

In the fourth and final example, the effect of shared function penalties is further explored, as well as the effect of shared functions having coverage over multiple components. The specific details of the relevant models for this example are listed below:
Components:
$C_1$: FailRate=0.01; Subcomponents: None
$C_2$: FailRate=0.01; Subcomponents: None
Shared Functions:
sf1={$(C_1, 0.5), (C_2, 0.9)$}; Input variability=0.1
sf2={$(C_1, 0.6), (C_2, 0.1)$}; Input variability=0.1
Tests:
$T_1$={sf1, sf2}; Result=Fail
$T_2$={sf1}; Result=Fail
$T_3$={sf1}; Result=Pass Given these models, the only relevant coverage element hitting sets are $CEHS_1$={sf1} and $CEHS_2$={sf1, sf2}, as they are the only coverage elements utilized in the failing tests $T_1$ and $T_2$. Also, since components $C_1$ and $C_2$ are both used in each of the shared functions, each component makes up a separate hitting set. As a result, $SEHS_1$={$C_1$} and $SEHS_2$={$C_2$}. A structural element hitting set combining the two is possible, but may be eliminated since the combination of both components failing is less likely than one or the other being exclusively defective.

As shown above, the scores for each coverage element hitting set is generated. Since $CEHS_1$ and $CEHS_2$ each cover both $SEHS_1$ and $SEHS_2$, a total of four CEHS scores are determined:

$$Score_{CEHS}(CEHS_1 \mid SEHS_1) =$$

$$OSFV(sf1) * (1 + EC(C_1)_{\forall CE \in CEHS1 \in T1; T2 \notin T3})$$

$$= \min(0.9, InputVariability(sf1) * 2,$$

$$InputVaiability(sf1) * (1 + 0.1 * (2 - 1)/1) * (1 + 0))$$

$$= \min(0.9, 0.1 * 2, 0.1 * (1.1)) = 0.11$$

$$Score_{CEHS}(CEHS_2 \mid SEHS_1) =$$

$$OSFV(sf1) * (1 + EC(C_1)_{\forall CE \in CEHS2 \in T1,T2 \notin T3})$$

$$= \min(0.9, InputVariability(sf1) * 2, InputVariability(sf1) *$$

$$(1 + 0.1 * (2 - 1)/1) * (1 + EC_{sf2}(C_1))$$

$$= \min(0.9, 0.1 * 2, 0.1 * (1.1)) * (1 + 0.6) = 0.11 * 1.6 = 0.176$$

$$Score_{CEHS}(CEHS_1 \mid SEHS_2) =$$

$$OSFV(sf1) * (1 + EC(C_2)_{\forall CE \in CEHS1 \in T1, T2 \notin T3})$$

$$= \min(0.9, InputVariability(sf1) * 2, InputVariability(sf1) *$$

$$(1 + 0.1 * (2 - 1)/1) * (1 + EC_{sf2}(C_2))$$

$$= \min(0.9, 0.1 * 2, 0.1 * (1.1)) * (1 + 0.1) = 0.11 * 1.1 = 0.121$$

Again, with the calculated CEHS scores, the scores for $SEHS_1$ and $SEHS_2$ are then computed:

$$Score_{SEHS}(SEHS_1 \mid \{CEHS\})$$

$$= \max(1 - EC(C_1)_{\forall CE \in CEHS \in Passing\ tests}, 0.01) * \max(Score_{CEHS}(\forall CEHS \in \{CEHS\} \mid SEHS_1))$$

$$= \max(1 - EC_{sf1}(C_1), 0.01) * Score_{SEHS}(CEHS_2 \mid SEHS_1))$$

$$= \max(1 - 0.5, 0.01) * 0.176 = 0.5 * 0.176 = 0.088$$

$$Score_{SEHS}(SEHS_2 \mid \{CEHS\})$$

$$= \max(1 - EC(C_2)_{\forall CE \in CEHS \in Passing\ tests}, 0.01) *$$

$$\max(Score_{CEHS}(\forall CEHS \in \{CEHS\} \mid SEHS_2))$$

$$= \max(1 - EC_{sf1}(C_2), 0.01) * Score_{CEHS}(CEHS_2 \mid SEHS_2)$$

$$= \max(1 - 0.9, 0.01) * 0.121 = 0.1 * 0.121 = 0.0121$$

Since no subcomponents are involved in this example, the resulting score for each of the two replaceable component hitting sets $\{C_1\}$ and $\{C_2\}$ is the score of the corresponding structural element hitting set, multiplied by the failure rate of the component:

$Score_{RCHS}(\{C_1\}) = FailRate(\{C_1\}) * Score_{SEHS}(SEHS_1 \mid \{CEHS\})$ $= 0.01 * 0.088 = 0.00088$ $Score_{RCHS}(\{C_2\}) = FailRate(\{C_2\}) * Score_{SEHS}(SEHS_2 \mid \{CEHS\})$ $= 0.01 * 0.0121 = 0.000121$ Thus, the score for replaceable component $\{C_1\}$ is significantly higher that that for $\{C_2\}$, which ultimately results from the penalty incurred in the score for $SEHS_2$ due in part to the heavy coverage of $C_2$ by pass-fail conflicted shared function sf1 in passing test $T_3$.

Oftentimes, some parameters of the test models, such as shared function input variability, test utilization of a particular component, or a component's failure rate, may not be known with precision. In other words, only a vague sense of the range of a particular value, such as "low," "medium," or "high," may be articulated. In such cases, it may be desirable to allow a description of those values in such terms, and then assign those descriptions a particular numeric value in the actual scoring functions. For example, a "low" input variability may be associated with a value of 0.1, with "medium" and "high" being assigned values of 0.5 and 0.9, respectively.

In addition to the scoring factors discussed above, replacement cost may also be a factor in the scoring of a candidate diagnosis. Replacement cost is the cost to replace a component, and may include the cost of the replacement component plus the cost to effect the replacement. For example, a factor of one plus a "normalized cost" in the range of (0,1] would serve to introduce the cost of each candidate diagnosis, which may be the sum of the replacement cost of the replaceable components in that diagnosis, as a secondary scoring factor. Other ways of introducing replacement cost into the scoring functions described above may also be implemented in alternate embodiments of the present invention. While replacement cost itself does not necessarily affect the likelihood that a component is defective, using cost as a factor may help distinguish between two otherwise similarly-weighted candidate diagnoses to help determine which of the two should be replaced first in attempting to eliminate the defect at the least cost.

From the foregoing, embodiments of the invention provide an improved method for weighting candidate diagnoses involving complex system faults, and thus, an overall improved fault diagnosis method. Very detailed descriptions of specific test examples of the various embodiments have been supplied and explained. However, embodiments of the invention other than those shown above are also possible, some of which have been discussed herein. As a result, the invention is not to be limited to the specific forms so described and illustrated; the invention is limited only by the claims.

What is claimed is:

1. A method for diagnosing faults in a system under test (SUT) having a plurality of components, the SUT having been tested by at least one system test, the method comprising:
    generating a candidate diagnosis potentially responsible for all failing system tests; and
    assigning a weight to the candidate diagnosis based on a combined unviolated utilization of the candidate diagnosis across all failing system tests, the weight thereby indicating a level of confidence that the candidate diagnosis is correct wherein the observed variability of the results of the system tests is defined by an observed variability of a pass-fail conflicted shared function.

2. The method of claim 1, wherein the effect of the combined unviolated utilization of the candidate diagnosis by failing system tests on the weight of the candidate diagnosis is limited by a mathematical governor.

3. The method of claim 1, wherein the weight of the candidate diagnosis is also based on a combined utilization of the candidate diagnosis by passing system tests.

4. The method of claim 3, wherein the effect of the combined utilization of the candidate diagnosis by passing system tests on the weight of the candidate diagnosis is limited by a mathematical governor.

5. The method of claim 1, wherein the weight of the candidate diagnosis is also based on an observed variability of the results of the system tests.

6. The method of claim 1, wherein the observed variability of the pass-fail conflicted shared function is quantified by the number of passing system tests employing the pass-fail conflicted shared function.

7. The method of claim 6, wherein the effect of the number of passing system tests employing the pass-fail conflicted shared function on the weight of the candidate diagnosis is limited by a mathematical governor.

8. The method of claim 1, wherein the observed variability of the pass-fail conflicted shared function is quantified by the number of failing system tests employing the pass-fail conflicted shared function.

9. The method of claim 8, wherein the effect of the number of failing system tests employing the pass-fail conflicted shared function on the weight of the candidate diagnosis is limited by a mathematical governor.

10. The method of claim 1, wherein the observed variability of the pass-fail conflicted shared function is quantified by the utilization of structural elements by the pass-fail conflicted shared function.

11. The method of claim 10, wherein the effect of the utilization of structural elements by the pass-fail conflicted shared function on the weight of the candidate diagnosis is limited by a mathematical governor.

12. The method of claim 1, wherein the weight of the candidate diagnosis is based on an overall utilization of subcomponents of at least one of the components of the candidate diagnosis.

13. The method of claim 12, wherein only the utilization of the subcomponents in passing system tests is considered.

14. The method of claim 13, wherein the effect of the utilization of the subcomponents of at least one of the components of the candidate diagnosis by passing system tests on the weight of the candidate diagnosis is limited by a mathematical governor.

15. The method of claim 14, wherein only the utilization of the subcomponents of failing system tests is considered.

16. The method of claim 15, wherein the effect of the utilization of the subcomponents of a least one of the components of the candidate diagnosis by failing system tests on the weight of the candidate diagnosis is limited by a mathematical governor.

17. The method of claim 1, wherein the weight of the candidate diagnosis is also based on the replacement cost of the components of the candidate diagnosis.

18. The method of claim 17, wherein the effect of the replacement cost of the components of the candidate diagnosis on the weight of the candidate diagnosis is limited by a mathematical governor.

19. The method of claim 1, wherein the weight of the candidate diagnosis is also based on the failure rate of the components of the candidate diagnosis.

20. The method of claim 19, wherein the effect of the failure rate of the components of the candidate diagnosis on the weight of the candidate diagnosis is limited by a mathematical governor.

21. A method for diagnosing faults in a system under test (SUT) having a plurality of components, the SUT having been tested by at least one system test, the method comprising:
generating a candidate diagnosis potentially responsible for a failing system test; and
assigning a weight to the candidate diagnosis based on a combined utilization of the candidate diagnosis by passing system tests, the weight thereby indicating a level of confidence that the candidate diagnosis is correct wherein the observed variability of the results of the system tests is defined by an observed variability of a pass-fail conflicted shared function.

22. The method of claim 21, wherein the effect of the combined utilization of the candidate diagnosis across passing system tests on the weight of the candidate diagnosis is limited by a mathematical governor.

23. The method of claim 21, wherein the weight of the candidate diagnosis is also based on an observed variability of the results of the system tests.

24. The method of claim 21, wherein the observed variability of the pass-fail conflicted shared function is quantified by the number of passing system tests employing the pass-fail conflicted shared function.

25. The method of claim 24, wherein the effect of the number of passing system tests employing the pass-fail conflicted shared function on the weight of the candidate diagnosis is limited by a mathematical governor.

26. The method of claim 25, wherein the observed variability of the pass-fail conflicted shared function is quantified by the number of failing system tests employing the pass-fail conflicted shared function.

27. The method of claim 26, wherein the effect of the number of failing system tests employing the pass-fail conflicted shared function on the weight of the candidate diagnosis is limited by a mathematical governor.

28. The method of claim 21, wherein the observed variability of the pass-fail conflicted shared function is quantified by the utilization of structural elements by the pass-fail conflicted shared function.

29. The method of claim 28, wherein the effect of the utilization of structural elements by the pass-fail conflicted shared function on the weight of the candidate diagnosis is limited by a mathematical governor.

30. The method of claim 21, wherein the weight of the candidate diagnosis is based on an overall utilization of subcomponents of at least one of the components of the candidate diagnosis.

31. The method of claim 30, wherein only the utilization of the subcomponents of passing system tests is considered.

32. The method of claim 31, wherein the effect of the utilization of the subcomponents of at least one of the components of the candidate diagnosis by passing system tests on the weight of the candidate diagnosis is limited by a mathematical governor.

33. The method of claim 30, wherein only the utilization of the subcomponents of failing system tests is considered.

34. The method of claim 33, wherein the effect of the utilization of the subcomponents of at least one of the components of the candidate diagnosis by failing system tests on the weight of the candidate diagnosis is limited by a mathematical governor.

35. The method of claim 21, wherein the weight of the candidate diagnosis is also based on the replacement cost of the components of the candidate diagnosis.

36. The method of claim 35, wherein the effect of the replacement cost of the components of the candidate diagnosis on the weight of the candidate diagnosis is limited by a mathematical governor.

37. The method of claim 21, wherein the weight of the candidate diagnosis is also based on the failure rate of the components of the candidate diagnosis.

38. The method of claim 37, wherein the effect of the failure rate of the components of the candidate diagnosis on the weight of the candidate diagnosis is limited by a mathematical governor.

39. A method for diagnosing faults in a system under test (SUT) having a plurality of components, the SUT having been tested by at least one system test, the method comprising:
generating a candidate diagnosis potentially responsible for a failing system test: and
assigning a weight to the candidate diagnosis based on an observed variability of the results of the system tests, the weight thereby indicating a level of confidence that the candidate diagnosis is correct wherein the observed variability of the results of the system tests is defined by an observed variability of a pass-fail conflicted shared function.

40. The method of claim 38, wherein the observed variability of the pass-fail conflicted shared function is quantified by the number of passing system tests employing the pass-fail conflicted shared function.

41. The method of claim 40, wherein the effect of the number of passing system tests employing the pass-fail conflicted shared function on the weight of the candidate diagnosis is limited by a mathematical governor.

42. The method of claim 39, wherein the observed variability of the pass-fail conflicted shared function is quantified by the number of failing system tests employing the pass-fail conflicted shared function.

43. The method of claim 42, wherein the effect of the number of failing system tests employing the pass-fail conflicted shared function on the weight of the candidate diagnosis is limited by a mathematical governor.

44. The method of claim 39, wherein the observed variability of the pass-fail conflicted shared function is quantified by the utilization of structural elements by the pass-fail conflicted shared function.

45. The method of claim 44, wherein the effect of the utilization of structural elements by the pass-fail conflicted shared function on the weight of the candidate diagnosis is limited by a mathematical governor.

46. The method of claim 39, wherein the weight of the candidate diagnosis is based on an overall utilization of subcomponents of a least one of the components of the candidate diagnosis.

47. The method of claim 46, wherein only the utilization of the subcomponents by passing system tests is considered.

48. The method of claim 47, wherein the effect of the utilization of the subcomponents of at least one of the components of the candidate diagnosis by passing system tests on the weight of the candidate diagnosis is limited by a mathematical governor.

49. The method of claim 46, wherein only the utilization of the subcomponents by passing system tests is considered.

50. The method of claim 49, wherein the effect of the utilization of the subcomponents of at least one of the components of the candidate diagnosis by failing system tests on the weight of the candidate diagnosis is limited by mathematical governor.

51. The method of claim 39, wherein the weight of the candidate diagnosis is also based on the replacement cost of the components of the candidate diagnosis.

52. The method of claim 51, wherein the effect of the replacement cost of the components of the candidate diagnosis on the weight of the candidate diagnosis is limited by a mathematical governor.

53. The method of claim 39, wherein the weight of the candidate diagnosis is also based on the failure rate of the components of the candidate diagnosis.

54. The method of claim 53, wherein the effect of the failure rate of the components of the candidate diagnosis on the weight of the candidate diagnosis is limited by a mathematical governor.

55. A program storage medium readable by a computer system, embodying a program executable by the computer system to perform method steps for diagnosing faults in a system under test (SUT) having a plurality of components, the SUT having been tested by at least one system test, the method steps comprising:
  generating a candidate diagnosis potentially responsible for a failing system test; and
  assigning a weight to the candidate diagnosis based on a combined unviolated utilization of the candidate diagnosis across failing system tests; the weight thereby indicating a level of confidence that the candidate diagnosis is correct wherein the observed variability of the results of the system tests is defined by an observed variability of a pass-fail conflicted shared function.

56. A program storage medium readable by a computer system, embodying a program executable by the computer system to perform method steps for diagnosing faults in a system under test (SUT) having a plurality of components, the SUT having been tested by at least one system test, the method steps comprising:
  generating a candidate diagnosis potentially responsible for a failing system test; and
  assigning a weight to the candidate diagnosis based on a combined utilization of the candidate diagnosis by passing system tests; the weight thereby indicating a level of confidence that the candidate diagnosis is correct wherein the observed variability of the results of the system tests is defined by an observed variability of a pass-fail conflicted shared function.

* * * * *